Aug. 12, 1924.

Q. A. BRACKETT 1,504,600

MEANS FOR PROTECTING WIRELESS OUTFITS FROM STATIC DISTURBANCES

Filed Jan. 16, 1919

WITNESSES:
H.J.Shelhamer
D.C.Davis.

INVENTOR
Quincy A. Brackett
BY
Wesley G. Carr
ATTORNEY

Patented Aug. 12, 1924.

1,504,600

UNITED STATES PATENT OFFICE.

QUINCY A. BRACKETT, OF PITTSBURGH, PENNSYLVANIA, ASSIGNOR TO WESTINGHOUSE ELECTRIC & MANUFACTURING COMPANY, A CORPORATION OF PENNSYLVANIA.

MEANS FOR PROTECTING WIRELESS OUTFITS FROM STATIC DISTURBANCES.

Application filed January 16, 1919. Serial No. 271,493.

*To all whom it may concern:*

Be it known that I, QUINCY A. BRACKETT, a citizen of the United States, and a resident of Pittsburgh, in the county of Allegheny and State of Pennsylvania, have invented a new and useful Improvement in Means for Protecting Wireless Outfits from Static Disturbances, of which the following is a specification.

My invention relates to means for protecting radio outfits from the effect of static disturbances, and it has for its object to provide simple and effective means whereby the major portion of the energy of static disturbances shall be shunted around the receiving apparatus so as to be ineffective in disturbing the receipt of impulses.

Figure 1:
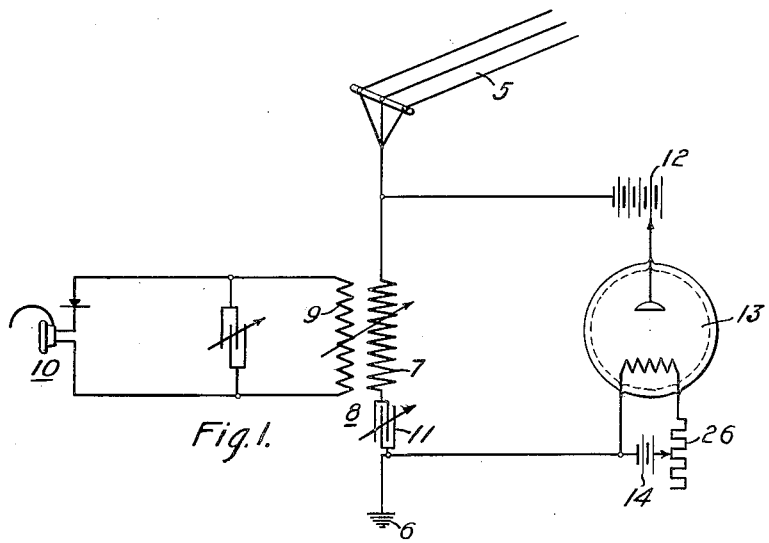
Figure 2:
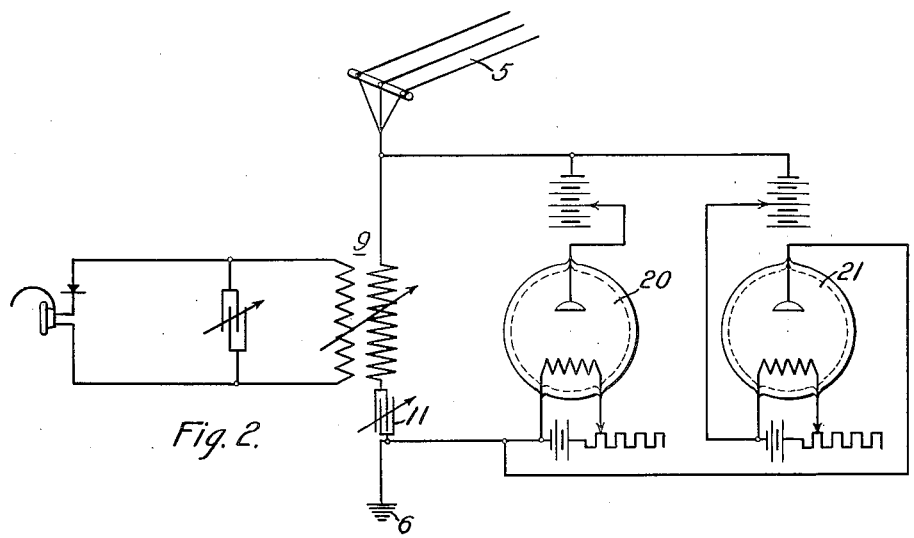
Figure 3:
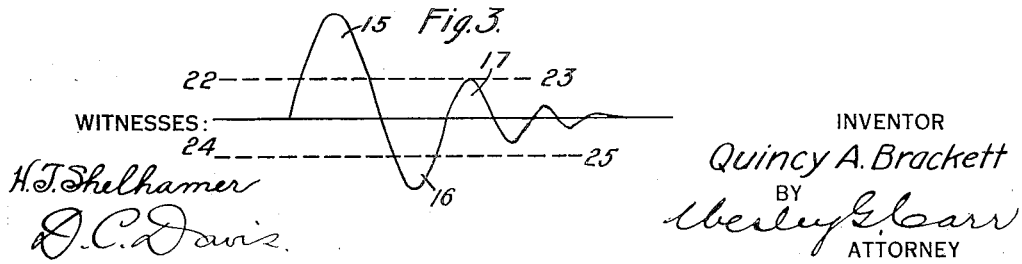

In the accompanying drawing, Fig. 1 is a diagrammatic view of a wireless receiving circuit, together with auxiliary apparatus, embodying one form of my invention; Fig. 2 is a similar view of a modification of the system shown in Fig. 1; and Fig. 3 is a diagram illustrating a heavily damped sine wave train of the usual incoming static disturbance.

It is well known that the receipt of signals in the wireless transmission of intelligence is frequently seriously interfered with by the action of static disturbances upon the receiving antenna. Those static disturbances, so called, are caused by lightning, by the friction of the wind upon the antenna, or by severe switching surges in transmission lines in the immediate neighborhood, the term "static" having acquired a generic significance in this connection.

The incoming static disturbances are usually in the form of a heavily damped sine-wave train, the initial half cycle comprising a large portion of the total energy of the disturbance and generally being of the same polarity.

I find that, if rectifying apparatus which has the property of a unilaterally conductive device be placed in shunt relation around the receiving apparatus and be so adjusted as to permit the flow of these initial half waves of static, the disturbing effect of the remainder of the static train may be neglected. In this way, transmission conditions may be much improved.

In a modification of my system, apparatus for the rectification and shunting of undesired impulses of both polarities is provided, advantage being taken of the fact that the most undesirable portion of the static impulses is, in many cases, of higher voltage than transmitted impulses and, therefore, is susceptible of being shunted by apparatus that is non-responsive to the transmitted impulses.

Referring to Fig. 1 of the drawing, an antenna is shown at 5, connected to ground at 6 through mutually annulling reactances such as a condenser 11 and the primary winding 7 of a receiving transformer 8. The secondary winding 9 of the transformer 8 is connected to a receiving set of usual form at 10. The primary winding 7 is shunted by a battery 12 and a rectifier 13, the latter being shown as of the hot-cathode type and having a filament-heating battery 14 with a regulating resistor 26 therefor.

In explaining the operation of the apparatus thus shown, the battery 12 may first be neglected.

The breakdown voltage of the rectifier 13 is such that the ordinary incoming impulses do not pass therethrough but are forced to traverse the primary winding 7. Upon the arrival of a static impulse, of the form shown in Fig. 3, having an initial half cycle 15 of far greater magnitude than the average incoming transmitted impulse, the rectifier 15 breaks down sufficiently to permit the flow of the major portion of this harmful half cycle therethrough. The succeeding half cycle 16 is of such polarity as not to traverse the rectifier 13 and this acts upon the receiving apparatus. The damping effect is so pronounced, however, that the energy of the half cycle 17 is far less than that of the half cycle 15, so that the disturbing effect is much less, even although the half cycle 17 does not traverse the rectifier 13, on account of its low voltage.

If desired, the adjustment of the rectifier 13 may be such that even the half cycle 17 will be diverted therethrough, thus further subtracting from the disturbing effect of the incoming static impulse. A similar result would follow if the incoming impulse were of such abnormal magnitude that the half cycle 17 was of sufficent voltage to flow through the rectifier.

It is obvious that the static impulses, having a steep wave front, encounter considerably more impedance in the inductor 7 than the transmitted waves, and this difference is increased by increasing the inductance of the inductor 7 and neutralizing the same with the condenser 11. Hence, the short-circuiting circuit, including the battery 12 and the rectifier 13, is impressed with a much greater potential-difference upon the passage of a static impulse than upon the passage of a signal current of equal magnitude.

The battery 12 is connected in such direction as to tend to cause current flow through the rectifier 13 but its voltage is adjusted to too low a value to set up this current flow unaided. The superimposing of a very small impulse, in the proper direction, upon the voltage of the battery, however, is sufficient to cause current flow through the rectifier and around the primary winding 7. In this way, the sensitiveness of the protective apparatus shown may be increased, as desired.

In like manner, the critical voltage of the rectifier 13 may be altered by changing the filament temperature, as through the adjustment of the resistor 26.

Particular attention is directed to the extremely flexible adjustment of the critical voltage of the rectifier 13 thus secured, either by the battery 12 or by the resistor 26, or by both, as it permits of extremely close adjustment during the receipt of weak signals. In this way, the sensitiveness of the entire system, during periods of excessive static, may be much enhanced.

Referring to the form of my invention shown in Fig. 2, the general elements of the system are as shown in Fig. 1 with the exception that two rectifying elements 20 and 21 are employed, these elements being so connected as to rectify or permit the passage of impulses of both polarities, provided these impulses exceed the critical breakdown voltages of the two rectifiers.

In operation, let it be assumed that the maximum amplitude of the incoming transmitted impulses is indicated by the lines 22—23 and 24—25 in Fig. 3. Under these conditions, the critical voltages in the two rectifiers are adjusted to slightly exceed the voltages corresponding to the ordinates of the lines 22—23 and 24—25, respectively. Thus, upon the occurrence of any impulse having a greater voltage than this critical breakdown value, all the energy is shunted around the receiving apparatus and is ineffective in the disturbance thereof.

Whether the system of Fig. 1 or that of Fig. 2 be employed depends upon the damping factor and other physical characteristics of the incoming static disturbances and also, to a certain extent, upon the wave form of the incoming transmitted impulses. If the static, which it is particularly desired to screen out, closely approximates the incoming transmitted impulses in wave form, it is more desirable to use the system of Fig. 1, merely excluding the first half cycle or the first and third half cycle, whereas, if the difference between the two wave forms is more pronounced, it is preferable to use the system of Fig. 2. In any event, it will be seen that, by shunting the rectifier apparatus 12, 13, 14 across the condenser 11 in series with the primary winding 7, I have automatically provided a superior limit to the voltage that can be impressed upon such apparatus. Thus, it should be obvious that, for a given induced maximum potential induced at the top of the antenna system by an incoming stray, the difference of potential at the bottom of the antenna will be materially lowered by placing the stray apparatus in shunt with a condenser in series with a self-induction. In this manner, the stray shunting apparatus itself is materially protected.

While I have shown my invention in its preferred form, it will be obvious to those skilled in the art that it is not so limited but is susceptible of various minor changes and modifications without departing from the spirit thereof, and I desire, therefore, that only such limitations shall be placed thereupon as are imposed by the prior art or are specifically set forth in the appended claim.

I claim as my invention:

In a receiving device, an aerial including a pair of adjustable reactors of opposite character, whereby said aerial may be tuned, a receiving circuit coupled to one of said reactors and including a signal-receiving device, and a shunt around said two reactors, said shunt including two rectifying devices connected in parallel to one another and in opposite directions in the shunt, each of said devices being provided with two means for adjustment, one controlling the normal potential across the device and the other controlling the critical voltage of the device.

In testimony whereof, I have hereunto subscribed my name this 30th day of Dec., 1918.

QUINCY A. BRACKETT.